US006194878B1

(12) United States Patent
Schafroth

(10) Patent No.: US 6,194,878 B1
(45) Date of Patent: Feb. 27, 2001

(54) ELECTRONIC SPEED CONTROL CIRCUIT

(75) Inventor: Konrad Schafroth, Bern (CH)

(73) Assignee: Conseils et Manufactures VLG SA, Neuchatel (CH)

( * ) Notice: Subject to any disclaimer, the term of this patent is extended or adjusted under 35 U.S.C. 154(b) by 0 days.

(21) Appl. No.: 09/035,340

(22) Filed: Mar. 5, 1998

(30) Foreign Application Priority Data

Jun. 25, 1997 (EP) ............................................... 97810403

(51) Int. Cl.[7] ............................... G04B 1/00; H02H 7/06

(52) U.S. Cl. ........................... 322/29; 368/203; 368/204; 368/140; 368/148

(58) Field of Search ................................ 322/18, 29, 95; 368/203, 204, 140, 148, 66, 157, 160

(56) References Cited

U.S. PATENT DOCUMENTS

| | | | | |
|---|---|---|---|---|
| 3,937,001 | | 2/1976 | Berney . | |
| 4,141,064 | | 2/1979 | Nagashima . | |
| 4,799,003 | * | 1/1989 | Tu et al. | 322/29 |
| 5,615,178 | * | 3/1997 | Takakura et al. | 368/203 |
| 5,668,414 | | 9/1997 | Takahashi et al. | 322/29 |
| 5,751,666 | * | 5/1998 | Farine et al. | 368/140 |
| 5,881,027 | * | 3/1999 | Schafroth | 368/203 |

FOREIGN PATENT DOCUMENTS

| | | |
|---|---|---|
| 597636 | 4/1978 | (CH) . |
| 665 082 B5 | 10/1998 | (CH) . |
| 196 38 616 A1 | 9/1996 | (DE) . |
| 19638616 | 9/1996 | (DE) . |
| 239820 | 7/1987 | (EP) . |
| 8-75874 | 3/1996 | (JP) . |
| WO 97/09657 | 3/1997 | (WO) . |

OTHER PUBLICATIONS

JP 63–190562 A (NEC Corp), Patent Abstracts of Japan, vol. 12, No. 469 (E–691), Dec. 8, 1988 (abstract).

Patent Abstracts of Japan, vol. 012, No. 469 (E–691), Dec. 8, 1988 & JP 63 190562 A (NEC Corp), Aug. 8, 1988, *Zusammenfassung*.

Hayakawa M: "A Study of the New Energy System for Quartz Watches (II)—The Effective Circuit for the System" Acte du Congres, Nr. 1, Sep. 23, 1988, Seiten 81–85, XP000035001.

* cited by examiner

*Primary Examiner*—Elvin Enad
*Assistant Examiner*—Peter Medley
(74) *Attorney, Agent, or Firm*—Pearne & Gordon LLP

(57) ABSTRACT

The electronic circuit allows the control or regulation of the speed of rotation of a microgenerator (1) in a watch movement. The electronic circuit includes two inputs (G–, G+) connected to said microgenerator, a quartz oscillator (3, 4), an energy-dissipation circuit (9) for braking said microgenerator, energy dissipation control means (5, 6, 7, 30, 31) for controlling the energy dissipation of the energy-dissipation circuit as a function of the frequency difference between the signal coming from the quartz oscillator and the signal coming from said microgenerator, and a rectifier and voltage-transformer (2) for rectifying and multiplying the signal coming from said microgenerator, with at least one capacitor (C1, C2, C3) charged by said microgenerator via at least one switch (17, 18, 19). The momentary energy dissipation of the braking circuit can further be reduced when the capacitors are charged. A control circuit for controlling the switches includes at least one flipflop (201, 211) which stores the control state of the switches.

54 Claims, 8 Drawing Sheets

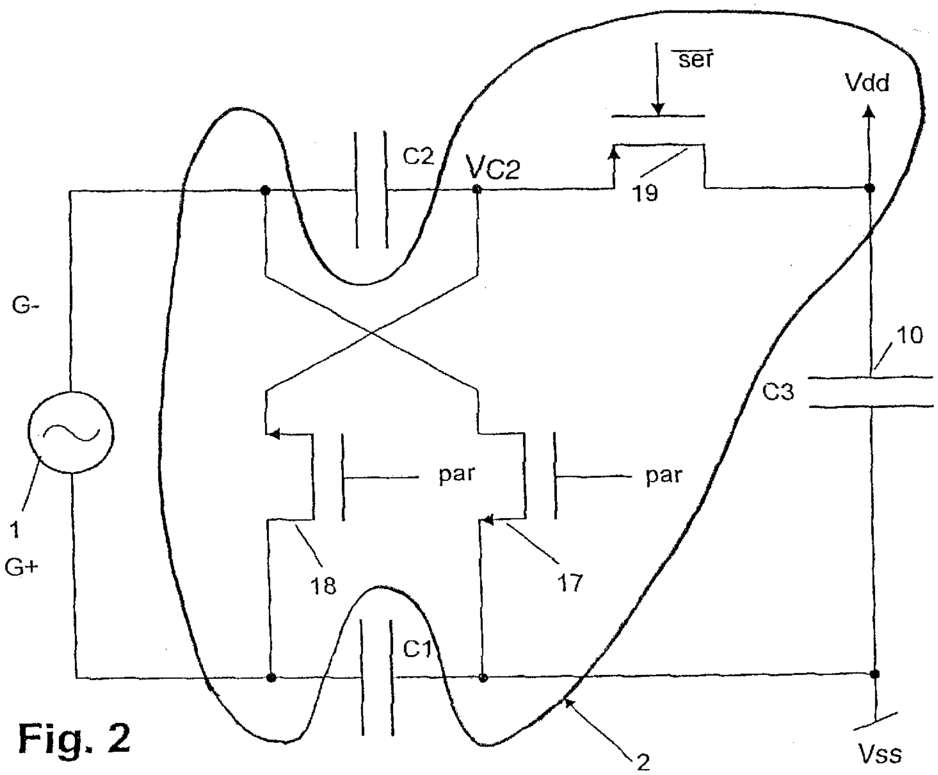
Fig. 2
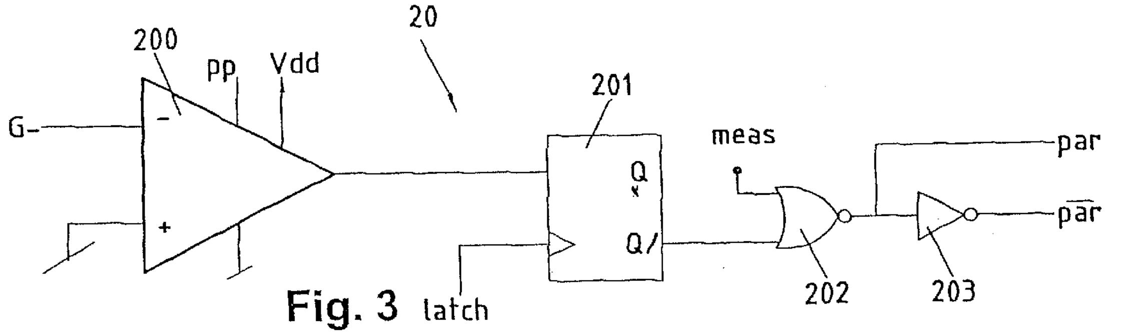
Fig. 3 latch
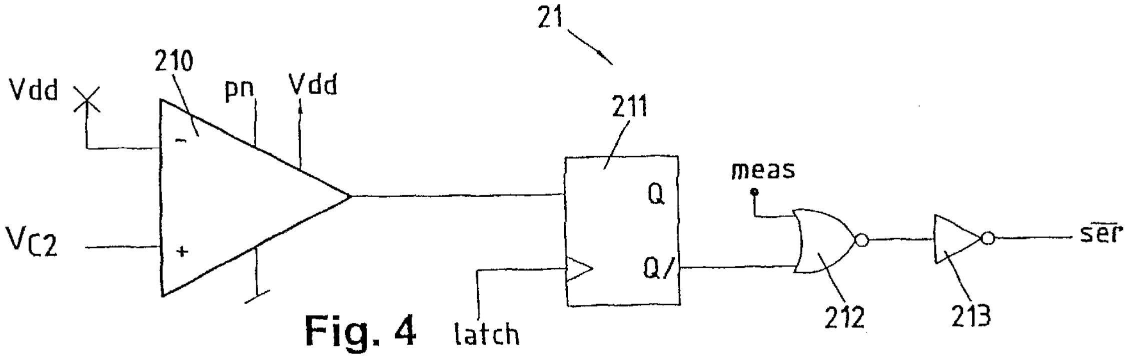
Fig. 4 latch

ELECTRONIC SPEED CONTROL CIRCUIT

BACKGROUND OF THE INVENTION

This invention relates to electronic circuits, and more particularly to an electronic circuit for controlling or regulating the speed of rotation of a microgenerator, of the type having a first input and a second input which can be connected to the microgenerator, an oscillator supplying a reference signal of a predetermined frequency, an energy-dissipation circuit for braking the microgenerator, energy-dissipation control means for controlling the energy dissipation of the energy-dissipation circuit as a function of the reference signal and of the signal between the mentioned inputs, a rectifier and voltage-multiplicating circuit for rectifying and multiplying the signal between the first and second inputs, the rectifier and voltage-multiplicating circuit containing at least one capacitor which can be charged by the microgenerator via at least one switch, and at least one control circuit of the mentioned switch or switches.

The invention further relates to a watch movement containing a circuit of the aforementioned type.

Numerous miniaturized electronic and electromechanical apparatus require an independent source of power. This source often consists of a battery pack or of solar cells. Batteries lead to various kinds of trouble, such as limited life, annoyingly frequent replacement, increased costs, and pollution of the environment. Solar cells operate only when there is sufficient light and require an additional store of energy. Further, their disposal may likewise lead to environmental problems, and fitting them into miniaturized apparatus such as watches, for instance, is difficult and leads to significant design restrictions.

In order to avoid such trouble, it has been proposed, e.g., in the U.S. Pat. No. 3,937,001, to replace the batteries of a watch movement by a generator and a spring driving the generator. The watch movement described contains a spring which, via gearing, drives a time display and a generator supplying an AC voltage. The generator feeds a rectifier, the rectifier feeds a capacitive component, and the capacitive component feeds an electronic reference circuit having a stable quartz oscillator and an electronic control circuit. The electronic control circuit has a comparator logic element and an energy-dissipation circuit connected to the output of the comparator logic element and controllable in its power draw by the comparator logic element. One input of the comparator logic element is connected to the electronic reference circuit and another input of the comparator logic element is connected to the generator. The comparator logic element is designed in such a way that it compares a clock signal coming from the electronic reference circuit with a clock signal coming from the generator, controls the magnitude of the power draw of the energy-dissipation circuit as a function of the result of this comparison, and in this way, via the control of the control-circuit power draw, controls the running of the generator and thus the running of the time display. In such a watch, the advantages of a mechanical watch, i.e., the absence of batteries, are combined with the accuracy of a quartz watch.

European Patent Application No. 0 239 820 and European Patent No. 679968 describe different electronic circuits for controlling the speed of a microgenerator in which a monitoring circuit constantly monitors the angular position of the rotor and brakes it as soon as its angular position is in advance. Because of their sensitivity to errors and phase variations of the components, these circuits are difficult to manage.

International Patent Application No. PCT/EP96/02791, the disclosure of which is incorporated in the present application by reference, describes an improved electronic control circuit which can be used in such a device. This application describes in particular a control circuit in which a voltage multiplicating circuit rectifies and multiplies the signal between the terminals of the generator. The voltage multiplicating circuit contains various capacitors C1, C2, C3 fed by the microgenerator through active elements, e.g., through field-effect transistors instead of diodes. Diodes are used only for initializing the system. In this way, the energy efficiency of the circuit can be greatly improved in that the threshold voltage losses of the diodes are avoided. Thus, the circuit can operate with a lower generator voltage, allowing a reduction in size of the generator and the spring and an increase in the power reserve of the watch movement. Furthermore, means are described for interrupting the braking of the microgenerator periodically so that optimum charging of the capacitors is ensured.

SUMMARY OF THE INVENTION

It is an object of this invention to provide an improved electronic circuit for regulating the speed of rotation of a microgenerator.

A further object of this invention is to provide such an electronic circuit which can be operated in a particularly favorable manner as regards power consumption.

To this end, in the electronic circuit according to the present invention for regulating the speed of rotation of a microgenerator, of the type originally mentioned, the control circuit of the switch or switches contains at least one storage means which in a first phase with blocked switch stores at least one control signal to be applied to the switches, and in a second phase the switches are triggered by means of the control signal.

BRIEF DESCRIPTION OF THE DRAWINGS

Preferred embodiments of the invention will now be described in detail with reference to the accompanying drawings, in which:

FIG. 2 is a diagram of a rectifier and voltage-multiplicating circuit,

FIG. 3 is a diagram of a first comparator used in the rectifier and voltage-multiplicating circuit, FIG. 4 is a diagram of a second comparator use in the rectifier and voltage-multiplicating circuit.

DETAILED DESCRIPTION OF THE PREFERRED EMBODIMENTS

Figure 1:
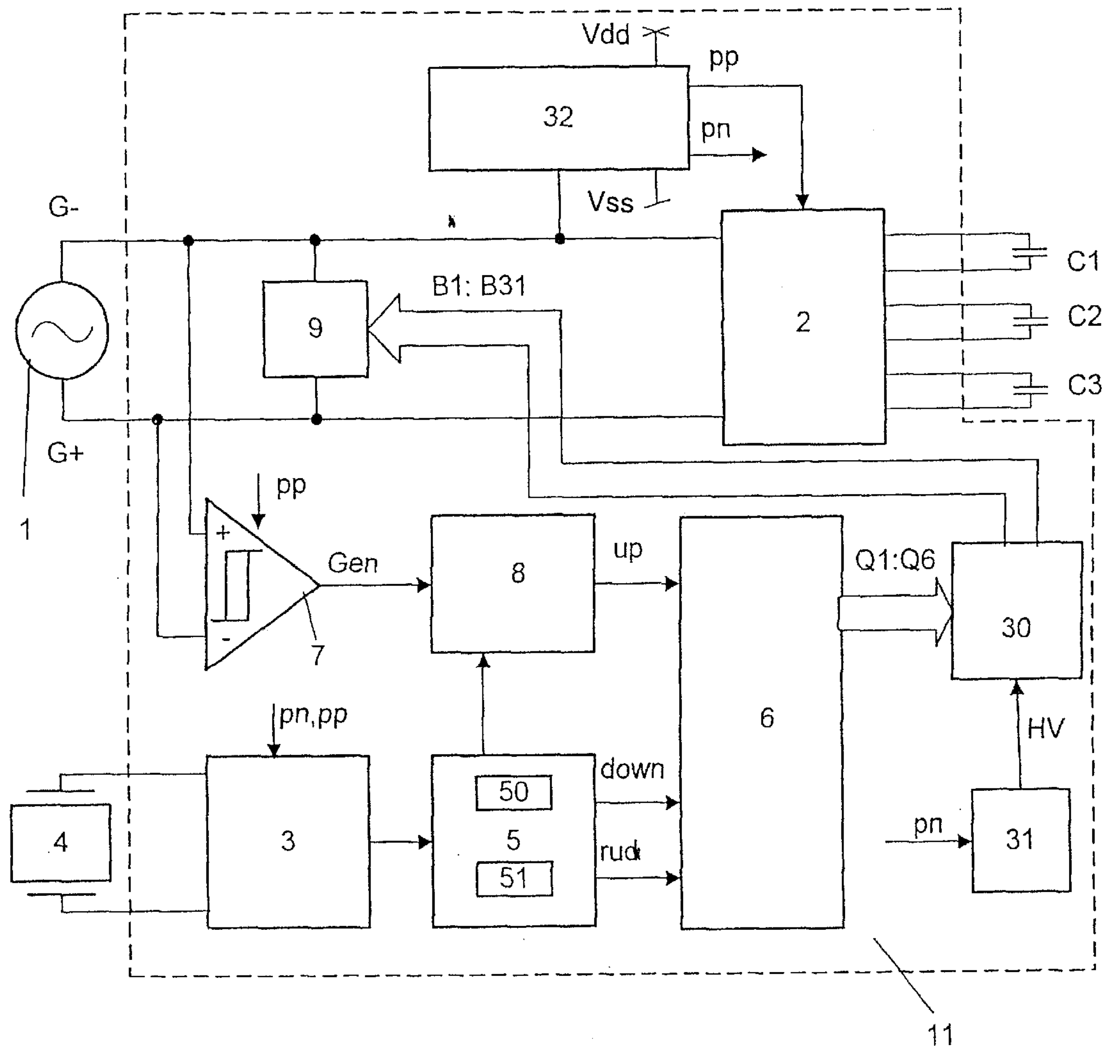
FIG. 1 is a block circuit diagram of the inventive electronic circuit.
Figure 11:
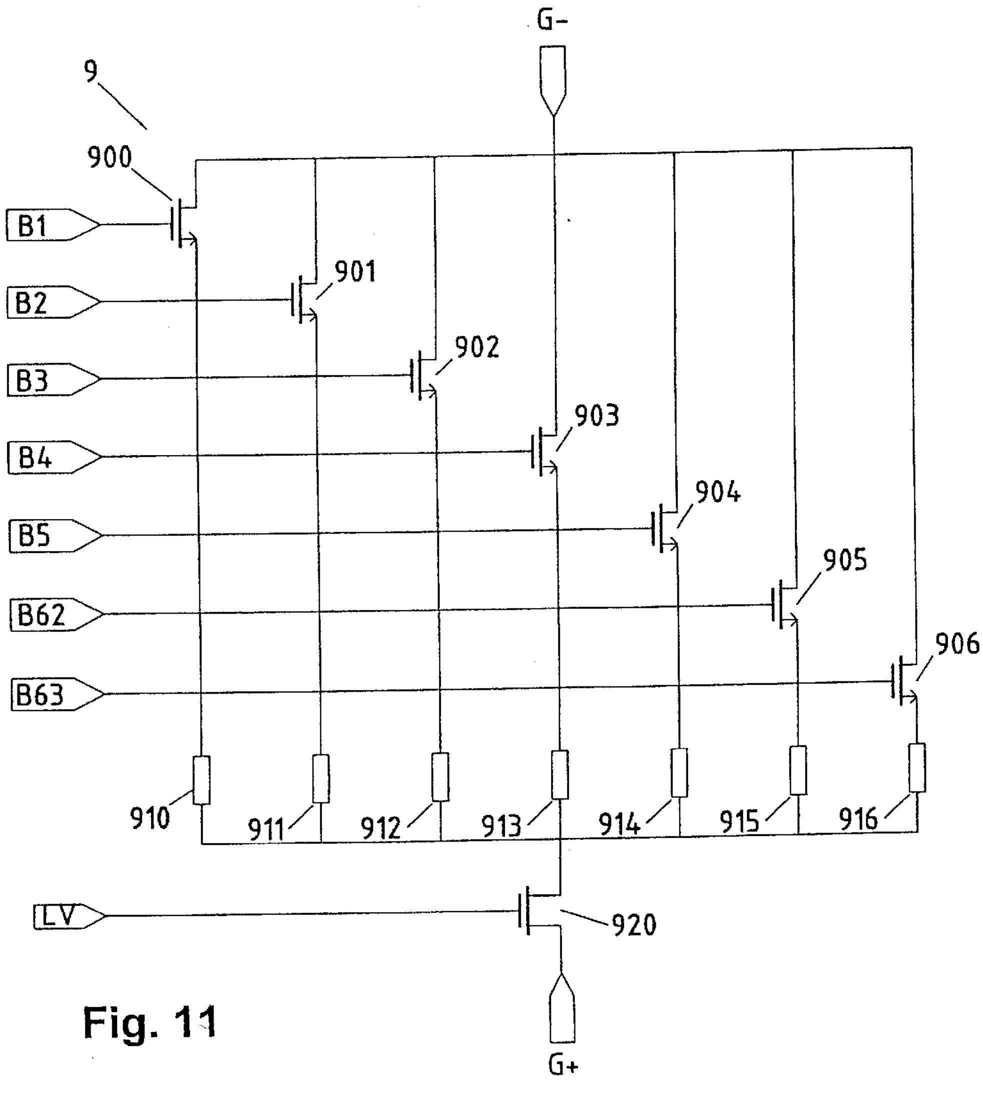
FIG. 11 is a diagram of an energy-dissipation circuit.

FIG. 1 is a block diagram of an inventive electronic circuit 11 for controlling or regulating the speed of a microgenerator 1. Circuit 11 is fed by microgenerator 1 whose speed it regulates via a capacitor C3 which temporarily stores the energy supplied by generator 1. Microgenerator 1, which generates an AC voltage, is driven by a spring (not shown) via gears (not shown). The gears further drive the hands (not shown). Circuit 11 controls the power draw of an energy-dissipation circuit 9 (FIG. 11) connected to microgenerator 1, so that the frequency of rotation of the rotor of microgenerator 1 is synchronized with the reference frequency at the output of a frequency divider 5, the input of which is fed by a quartz oscillator 3, 4.

The microgenerator used may, for example, be such as is described in European Patent Application No. 96810901.7, the disclosure of which is specifically incorporated here by reference. The nominal frequency of the AC voltage of microgenerator 1 is preferably $2^n$, n being a natural number other than zero. The mechanical portion of the watch movement forms part of the prior art and is described, for example, in U.S. Pat. No. 3,937,001.

Microgenerator 1 is connected to the two inputs G− and G+ of electronic circuit 11. Circuit 11 preferably takes the form of a single IC. Inputs G− and G+ are connected to a rectifier and voltage-transformer circuit 2, the function of which is described below with reference to FIGS. 2–5. Rectifier and voltage multiplicating circuit 2 charges a storage capacitor C3, which temporarily stores the electrical energy generated by microgenerator 1 and supplies the energy to the IC in the form of a substantially continuous voltage. Rectifier and voltage multiplicating circuit 2 also uses two further capacitors C1 and C2. Capacitors C1, C2, and C3 are preferably external, although they may possibly be integrated in IC 11.

Figure 10:
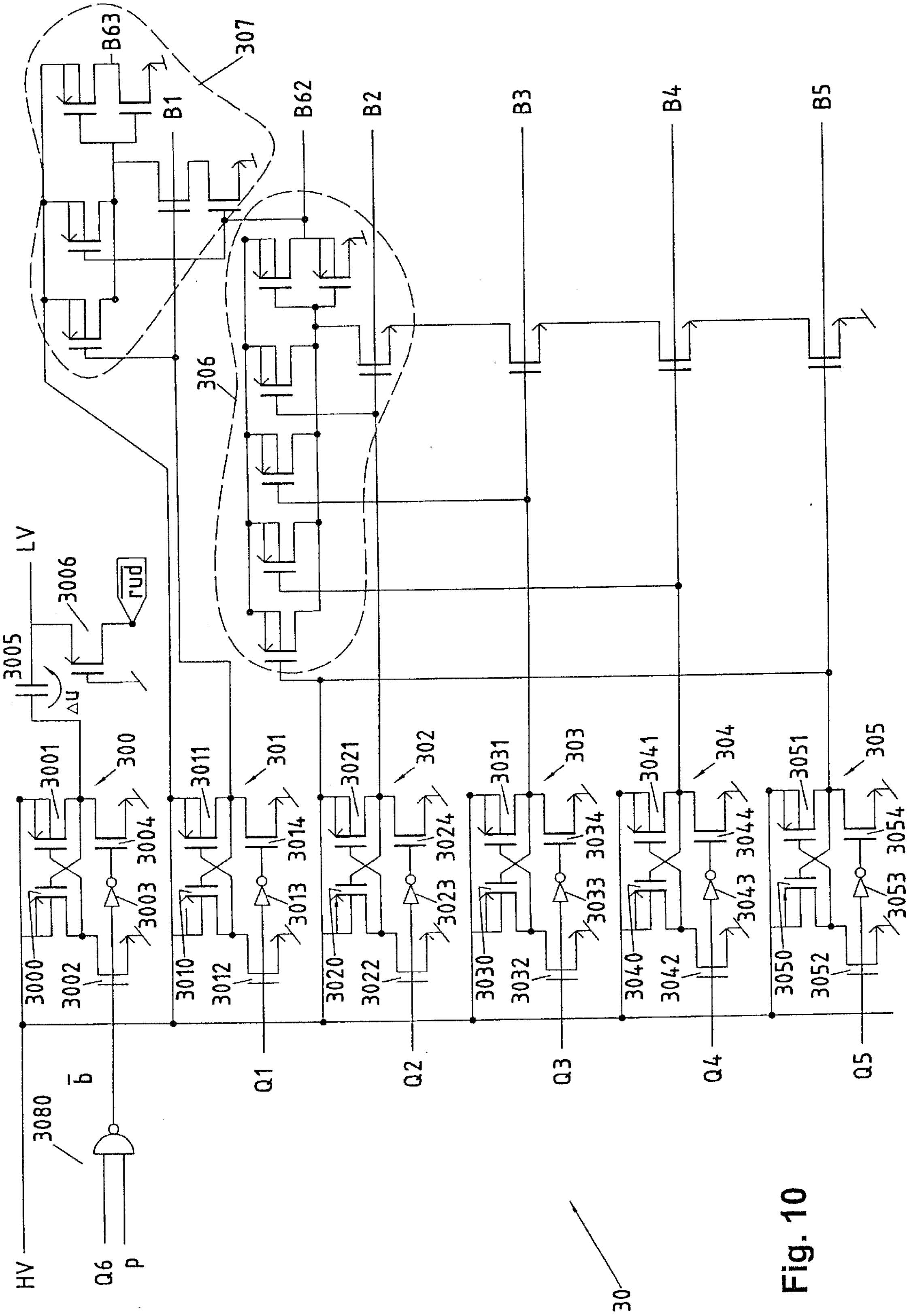
FIG. 10 is a diagram of a control circuit controlling the energy dissipation of the energy-dissipation circuit.

In the embodiment illustrated, energy-dissipation circuit 9 is connected in parallel with microgenerator 1. However, energy-dissipation circuit 9 might instead be disposed on the other side from rectifier and voltage transformer 2, connected in parallel with capacitor C3. Energy-dissipation circuit 9 consists of an ohmic resistor, the resistance of which is controlled by energy-dissipation control means 30 (FIG. 10). Energy-dissipation circuit 9 might also consist of an adjustable power source. The speed of rotation of the rotor of microgenerator 1 is controlled by varying the resistance.

Figure 6:
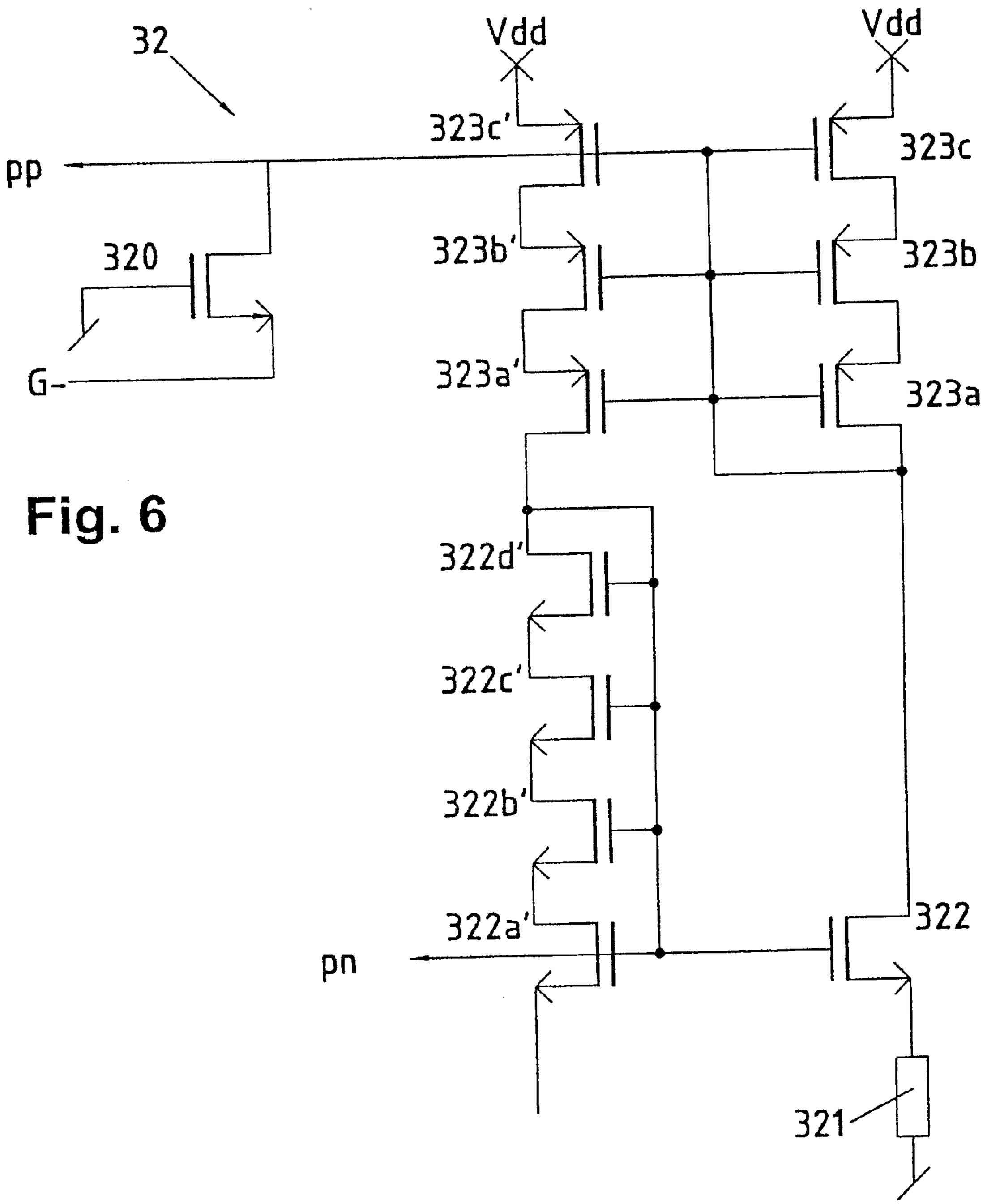
FIG. 6 is a diagram of a power source supplying various parts of the circuit with power.

A stabilized power source 32, described in detail with reference to FIG. 6, produces different stabilized currents pp, pn, intended to feed rectifier and voltage transformer 2 and elements 3, 7, 31. Stabilized power source 32 procures its energy from capacitor C3 which feeds the entire IC. Oscillator 3, 4 supplies a reference signal having a predetermined frequency. Oscillator 3, 4 has a quartz 4 which is preferably mounted outside IC 11 and the oscillations of which define a reference frequency at the output of oscillator 3. By means of frequency divider 5, this reference frequency is divided by a predetermined factor described in detail with reference to FIGS. 7 and 8.

Figure 9:
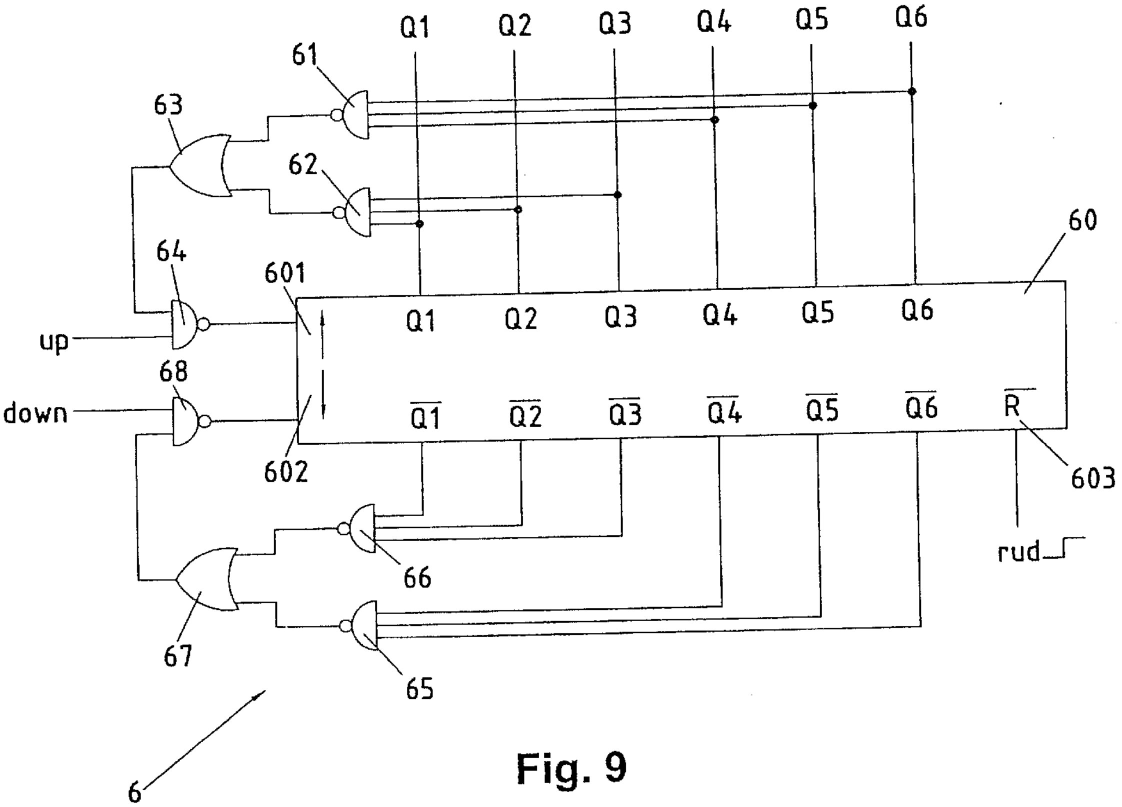
FIG. 9 is a diagram of a counter, the reading of which is dependent upon the frequency difference between the generator and a reference frequency.

The IC further comprises a counter 6, which is described in detail with reference to FIG. 9. A decrementing input (DOWN) of counter 6 is connected to the output of frequency divider 5, while the incrementing input (UP) of counter 6 is connected to microgenerator 1 via a hysteresis comparator, which ascertains the zero transitions of the signal at the output of microgenerator 1, and via an anticoincidence circuit 8. Anticoincidence circuit 8 prevents UP and DOWN pulses from coming in simultaneously at both inputs of counter 6, which might otherwise behave unpredictably. For this purpose, circuit 8 synchronizes the UP and DOWN signals with signals of different phases coming from frequency divider 5. The IC further comprises an internal voltage doubler 31 making it possible to feed and trigger the energy-dissipation control means 30 and the energy-dissipation circuit 9 with a higher voltage HV> and a lower voltage LV<, where $V_{ss}$ is ground.

Energy-dissipation control means 30 control the energy dissipation of energy-dissipation circuit 9 as a function of the reference signal generated by quartz oscillator 3, 4 and of the signal coming from microgenerator 1. When the rotor of microgenerator 1 turns too fast, the frequency of the signal between inputs G+ and G− is higher than the frequency of the reference signal at the output of frequency divider 5.

Therefore, during a given interval, counter 6 receives more pulses at its incrementing input UP than at its decrementing input DOWN; its count thus increases. As a function of this count, the energy-dissipation control means 30 control the resistance of energy-dissipation circuit 9 and, consequently, the energy dissipation, in such a way that microgenerator 1 is braked. In this way, the rotational frequency of microgenerator 1—and thus the running of the time display as well—is synchronized with the reference frequency coming from the quartz oscillator.

The regulating value B1:B31 supplied to energy-dissipation circuit 9 by energy-dissipation control means circuit 30 depends in this embodiment upon the reading of counter 6, i.e., upon the difference between the number of pulses of the signal UP coming from microgenerator 1 and the number of DOWN pulses coming from quartz oscillator 3, 4 since the watch started running. The type of control or regulation is therefore integral. Other types of control, e.g., a regulation proportional to the momentary frequency difference or to the gradient of the frequency difference, or a proportional-integral derived (PID) control, may also be used. In the embodiment illustrated, the speed of rotation of the rotor is controlled by regulating the braking resistance in energy-dissipation circuit 9; however, an on-off control might be used instead.

As mentioned, energy-dissipation control means 30 comprises a hysteresis comparator 7 which compares the signals G+, G− at the two inputs connected to microgenerator 1. Thus the signal Gen at the output of comparator 7 is a rectangular signal which changes its state upon each change of polarity of the signal between the inputs G+, G−. The use of a hysteresis comparator allows disturbances of the signal between the inputs G+, G− to be filtered out. To avoid unwanted changes in value of the signal Gen which would lead to erroneous incrementations and thus to excessive braking of microgenerator 1, other filter means may be provided, e.g., a low-pass or band-pass filter, or a filter which changes its state only after a predefined period of time. Hysteresis comparator 7 is fed by power source 32.

Rectifier and voltage-multiplicating circuit 2 is shown in FIGS. 2–5.

In order to achieve the greatest possible efficiency, the diodes normally used are replaced in this circuit by switches 17, 18, 19 and comparators 20, 21 triggering these switches, as already proposed in the aforementioned International Patent Application No. PCT/EP96/02791. A first switch 19 is connected in series with microgenerator 1 and with the earlier mentioned storage capacitor C3.

First switch 19 preferably consists of a field-effect transistor which, immediately after starting of the watch movement, acts as a simple diode. At that moment, the voltage drop across switch 19 is equal to the diode threshold voltage, about 400 mV. As soon as the potential of capacitor C3 is high enough for the internal power source, and thus also the comparators, to function, the transistors acting as switches are triggered by the comparators. When the voltage supplied by the voltage-tripler circuit is higher than the voltage of capacitor C3, the first field-effect transistor is enabled. However, the voltage drop across the channel of the field-effect transistor amounts to only about 10 mV. Hence when transistors and the comparators triggering the transistors are used instead of diodes, the voltage loss is considerably reduced, the energy reserve of the watch movement is used more economically, and the power reserve is increased.

Field-effect transistor 19 is not disabled again until the voltage C2 supplied by the voltage-tripler circuit again drops below the voltage Vdd of first capacitor C3.

First switch 19 is controlled by a signal/ser transmitted by a first comparator circuit 21 shown in FIG. 4.

Comparator circuit 21 has a comparator 210 which compares the voltage on both sides of switch 19. When voltage VC2 on the left-hand side of switch 19 is higher than the voltage Vdd on the right-hand side, the output of comparator 210 passes from 0 to 1.

Normal comparators always have a (positive or negative) offset voltage $V_0$. In order for the output of comparator 210 to pass to 1, the following condition must therefore be met:

$$V_{C2} > Vdd + V_0$$

If, for instance, the offset voltage is +2 mV, the difference of potential across switch 19 must amount to 2 mV or more in order for the output of comparator 210 to pass to 1.

If, however, switch 19 were directly controlled by comparator 210, switch 19 would close as soon as the difference of potential was 2 mV or more. Yet because the internal resistance of this switch is low, the voltage drop across the closed switch can be smaller than the offset voltage. In this case, switch 19 would be immediately reopened. The difference of potential across switch 19 would then be present again, so that the output of the comparator would again pass to 1, and switch 19 would close again: the system could oscillate.

In order to avoid this problem, the present invention provides for a time difference between measuring and switching. First, switch 19 is blocked by the meas signal, and the comparator is thereby able to detect the difference of potential across the switch. Thereafter, the value at the output of comparator 210 with transistor 19 disabled is stored in a storage element 211 by means of a latch signal. Not until after a certain interval do the meas and latch signals pass to 0, and switch 19 is triggered by means of the value ser stored in storage element 211. In this way, it is ensured that the system does not oscillate and that the current flows from C2 to Vdd.

Figure 5A:
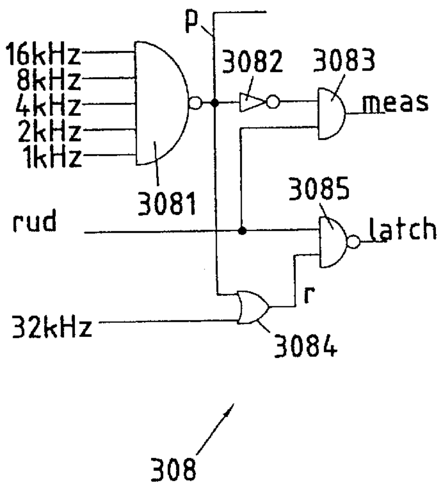
FIG. 5*a* is a diagram of a logic circuit generating two signals, latch and meas.
Figure 5B:
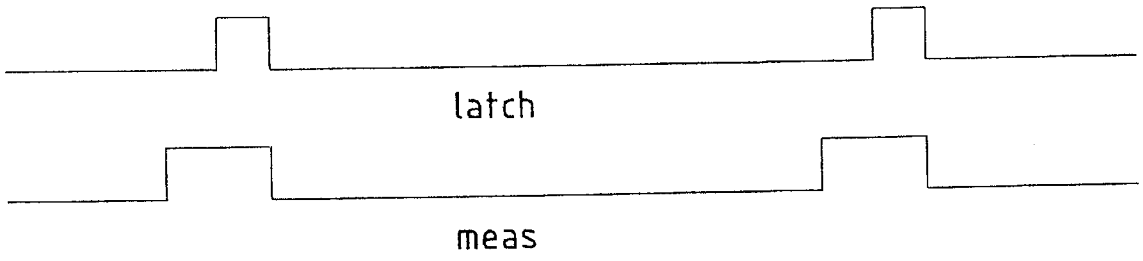
FIG. 5*b* is a wave diagram of the latch and meas signals.
Figure 8:
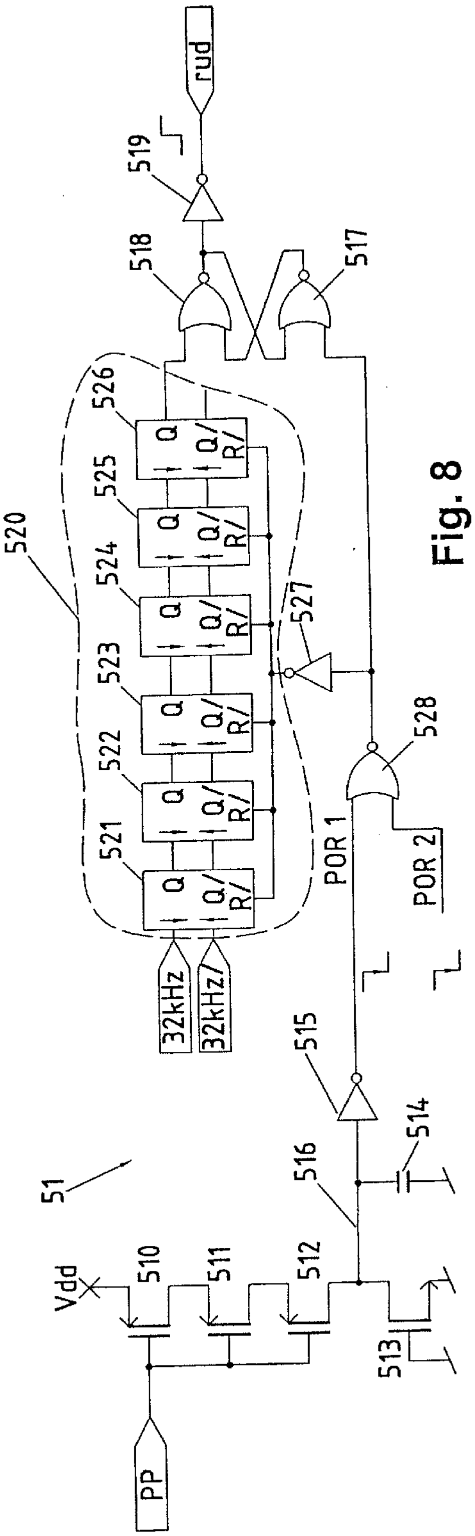
FIG. 8 is a diagram of a circuit for starting up the system upon initialization.

The formation of the two delayed signals latch and meas, shown in FIG. 5*b*, is described with reference to FIG. 5*a*. A NAND gate 3081, which combines the 16 kHz, 8 kHz, 4 kHz, 2 kHz, and 1 kHz signals supplied by frequency divider 5, transmits a signal p. Accordingly, pulsing signal p always has a value of 1 except once per 1 kHz cycle during a 16 kHz half cycle. This signal at the output of NAND gate 3081 is inverted by an inverter 3082 connected to an AND gate 3083. A power-on reset signal rud, the formation of which is explained below with reference to FIG. 8, is supplied at the other input of gate 3083. When the circuit is started up, the rud signal is zero, thereafter always one. Thus, the meas signal supplied by gate 3083 is always zero except after starting-up, when the logical state of p is 1.

Signal p at the output of NAND gate 3081 is also transmitted to an OR gate 3084 which likewise receives a 32 kHz signal coming from frequency divider 5. The signal r supplied by gate 3084 consequently always has a value of zero except when p and the 32 kHz signal are simultaneously zero, i.e., once per 1 kHz cycle during half a 32 kHz cycle. This signal is validated by the rud signal and inverted by means of a NAND gate 3085. Thus, the latch signal supplied by gate 3085 equals only when r has assumed a value of 1 and when rud is not simultaneously zero. The latch signal is used in this way in order to store the state at the outputs of comparators 20 and 21, respectively, in storage elements 201, 211 in comparator circuits 20, 21.

The meas and latch signals can be formed only when the quartz oscillator and the divider chain are working. This is not the case, however, when the circuit starts up, so the circuit must be designed in such a way that when the system is started up, the switches are triggered directly by the comparators: when the system is set running, the meas and latch signals are kept at zero and one, respectively, by the rud signal. Switch 19 is thereby triggered directly by comparators 20, 21. As soon as the rud signal passes to one, meaning that the quartz oscillator and the divider chain are working, switch 19 is triggered by means of the value stored in storage means 211.

Voltage tripler C2, C1, 17, 18 comprises a second capacitor C2 and a third capacitor C1 connected in series with microgenerator 1 at inputs G+and G−. A second switch 17 is connected between input G− and the grounded end of third capacitor C1 opposite microgenerator 1. A third switch 18 is connected between input G+ and the end of second capacitor C2 opposite microgenerator 1 which is connected to first switch 19. Switches 17 and 18 are controlled by a second comparator circuit 20 (FIG. 3) which compares the electric potential of input G−, connected to second capacitor C2, with the potential of the ground.

Switches 17 and 18 likewise consist of field-effect transistors acting in the disabled state as diodes. When the watch movement starts running, capacitors C2 and C1 are charged by the diode structures of transistors 17 and 18. As soon as the comparators are working and the voltage of the generator at junction G− is lower than Vss, second comparator circuit 20 flips with the next edge of the meas signal, and with the edge of the latch signal the state of the comparator is stored in storage element 201 and the switches are triggered by means of the stored values. Transistors 17 and 18 are then conducting. Capacitors C2 and C1 are consequently charged solely over the channels of transistors 17 and 18, which proves to be favorable energy-wise. It should be noted that input G−, connected to microgenerator 1, is grounded over the channel of transistor 17 as soon as the latter becomes conducting.

Other voltage multiplicating circuits are described in the earlier mentioned International Application No. PCT/EP96/02791 and in European Patent No. 695,978, for example.

Comparators 200 and 210 (FIGS. 3 and 4) are fed by voltage Vdd stored in capacitor C3. They further require current feeds pp and pn, respectively, which is managed through power source 32 explained in FIG. 6. The comparators do not work as long as the respective currents pp and pn are not high enough; in that case, their outputs remain in zero state so that the controlled switches 17, 18, 19 remain blocked.

Power source 32 consists of a conventional current mirror. It comprises a resistor 321 having a high value, e.g., 300 Ω, connected between the ground and the source of an n-channel field-effect transistor 322. The drain of transistor 322 is connected in series with the drain of field-effect transistor 323*a* and with the gates of three p-channel transistors 323*a*, 323*b*, and 323*c*, the source of the latter being fed by the voltage generated by voltage transformer 2. The drain of transistor 322 is further connected to the gates of the three p-channel field-effect transistors 323*a*, 323*b*, and 323*c* as a mirror circuit. The pp current flowing through the channel of transistor 322 and resistor 321 feeds comparator 200 illustrated in FIG. 3.

The drain of transistor 323*a* is connected to the drain of n-channel transistor 322 and in series with the gates of n-channel transistors 322*a*', 322*b*', 322*c*', and 322*d*' and as a mirror concerning transistor 322. The source of transistor 322*a*' is grounded. The pn current flowing through transistors 323*a*', 323*b*', and 323*c*' feeds comparator 210 illustrated in FIG. 4.

The mode of operation of this type of power source with current mirror is known per se and is consequently described only briefly. When the pp current increases, the current drop across resistor 322 likewise increases, and the voltage at the drain of transistor 322 accordingly increases as well. The voltage applied to transistors 322*a*', 323*b*', and 323*c*' is consequently increased, which leads to their disabling, so that the voltage at the drain of p-channel transistor 323*a*' decreases. This voltage is applied to the gate of p-channel transistor 322, which becomes less conducting since its gate voltage is reduced. Accordingly, transistor 322 has the tendency to become disabled and to limit the pp current.

Conversely, a lessening of pp leads to a reduction of the voltage drop across resistor 323 and hence to a voltage reduction which is applied to the gates of p-channel transistors 323*a*', 323*b*', and 323*c*'. These consequently become more conducting, leading to an increase of the voltage at the drain of transistor 323*a*' applied to the gate of transistor 322. The latter therefore becomes more conducting and allows an increase of the pp current flowing through. The pp current is stabilized and thus depends only slightly upon the load applied. It is easily shown that the pn current flowing through transistors 323*a*', 323*b*', and 323*c*' is stabilized in the same manner.

The magnitude of the current can therefore be determined by adapting the characteristics of the elements in the power source, particularly the number of transistors and the size of their channels. It is thus possible to determine the currents pp and pn freely through the two branches of the mirror.

Such a current mirror has two stable states. The first one has been described and is achieved when the pp and pn currents have reached the desired intensities. The second state corresponds to the pp and pn currents equal to zero. This second state is achieved when all transistors are disabled. It exists particularly when voltage is applied to the system, after which the pp and pn currents are thus zero. An n-channel initializing transistor 320 is provided in order to force a current through current mirror 32 in the starting-up phase so that it reaches its first stable state. The gate of transistor 320 is grounded, while its source is connected to input G− of microgenerator 1. The drain of initializing transistor 320 is connected to the gates of the p-channel transistors. During the starting-up phase of the watch movement, microgenerator 1 is floating with respect to ground. Signal G− at the input of microgenerator 1 consequently oscillates in an approximately sinusoidal manner in relation to ground. When input signal G− is negative, i.e., is below ground voltage, transistor 320 becomes conducting, and the negative voltage of G− is applied to the gates of p-channel transistors 323*a*', 323*b*', and 323*c*'. Hence these transistors suddenly become conducting so that only a pn current circulates, the voltage at the gate of transistor 322 rises, and this transistor also conducts a pp current. As explained above, this current is applied to comparator 20 (FIG. 3) in the rectifier and voltage multiplicating circuit 2, which begins to operate. The output signal of comparator circuit 20 changes its state, as indicated in FIG. 2, when the voltage at the junction G− is lower than Vss, and enables transistors 17 and 18, thus grounding input G− of microgenerator 1 and connecting input G+ of microgenerator 1 to C2. As soon as input G− is grounded, transistor 320 is disabled and thereafter ceases to consume current. Power source 2 is henceforth initialized, and the pp and pn currents quickly attain the desired values.

The power source may easily be completed, e.g., by means of other n-channel transistors, the gates of which are connected to the drain of transistor 323*a*' and the sources grounded. Thus, the current through these transistors can easily be controlled for feeding other components, e.g., components of quartz oscillator 3, 4.

Figure 7:
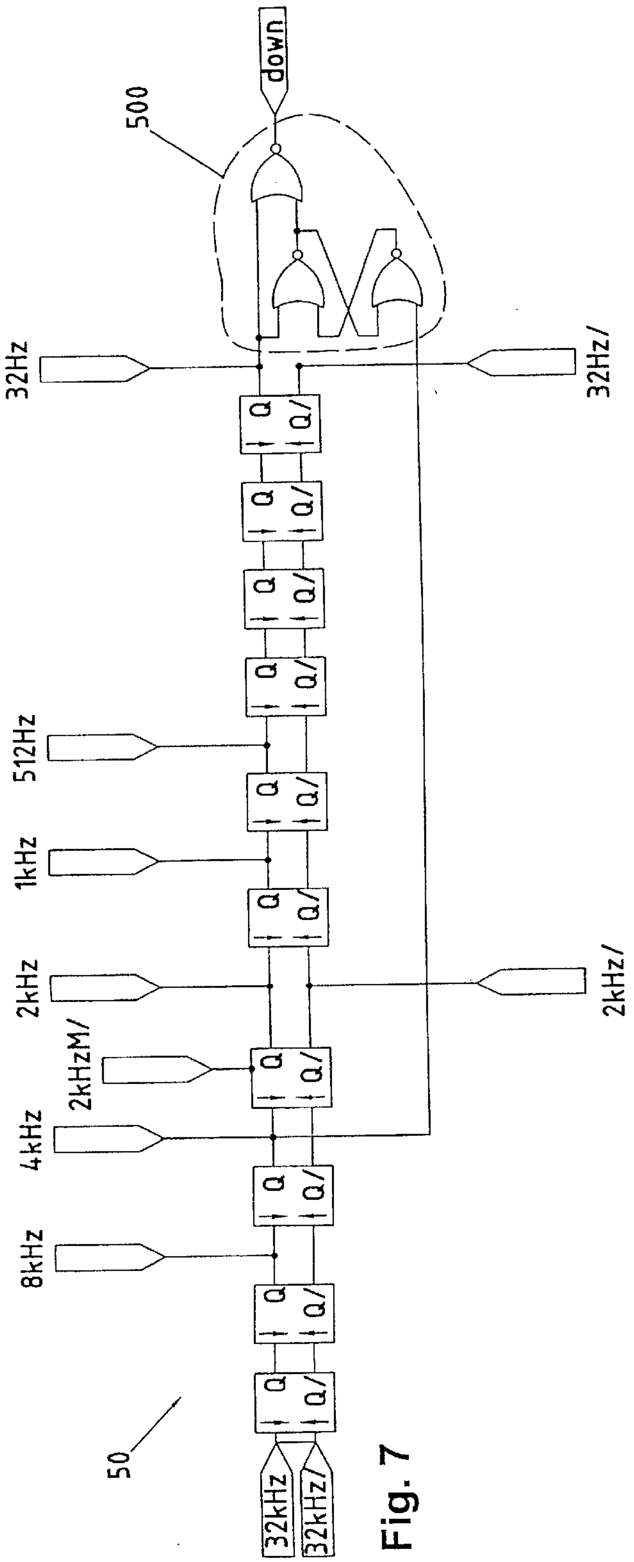
FIG. 7 is a frequency divider which divides the frequency generated by a quartz oscillator.

FIG. 7 illustrates a preferred embodiment of the invention comprising a frequency divider 50 consisting of ten D-flipflops connected in series. The frequency of the signal is divided by 2 at each flipflop. When the reference signal supplied by oscillator 3, 4 at the input of frequency divider 50 oscillates at 32 kHz, the frequency of the signal at the output of divider 50 is $2^{-10}$32 kHz, i.e., 32 Hz. This signal is combined by a circuit 500 with the 4 kHz signal in order to generate a DOWN signal which assumes the logic state 1 just once per cycle of 32 Hz and during a half cycle of 4 kHz.

FIG. 8 illustrates a circuit 51 which delivers a power-on reset signal rud. This signal is intended, among other things, to reset counter 6 to a predetermined value upon initialization and to cut out energy-dissipation circuit 9. Circuit 51 comprises three p-channel field-effect transistors 510, 511, and 512 disposed in series with a p-channel transistor between ground and the feed. The gates of the three p-channel transistors receive the pp signal coming from power source 32. During initialization, the three transistors 510, 511, and 512 remain disabled as long as power source 32 does not supply sufficient current. Hence the voltage at point 516 is zero. An inverter 550 converts this voltage into a signal POR1 which is combined by means of an OR gate 528 with a signal POR2. The signal at the output of gate 528 is relayed to a flipflop consisting of two NOR gates 517 and 518 and having two inputs. The other input of flipflop 517, 518 is connected to the output of a frequency divider 520 composed of five flipflops 521–526. The 32 Hz output signal supplied by frequency divider 50 is connected to the input of the first flipflop 521. The /reset inputs for resetting flipflops 521–526 are connected via an inverter 527 to the output of inverter 515.

Upon initialization, signal POR1 is binary one as long as the power source does not supply sufficient power. Similarly, signal POR2 is binary one as long as the frequency from frequency divider 5 does not reach a predetermined value. Consequently, the signal at the output of gate 528 is not zero until the quartz oscillator and the power source are both working.

Upon initialization, this signal is still at 1, so that flipflops 521–526 are all set to zero. The input of flipflop 517, 518 connected to flipflop 526 thus receives the logic state zero, whereas the input connected to inverter 515 receives the logic state 1. The signal is inverted by inverter 519 into a signal called rud (reset up-down counter) and having a logic value of zero.

As soon as the power source is supplying enough power, the three transistors 510 to 512 become conducting. The signal at point 516 is therefore Vdd, so that inverter 515 supplies a signal POR1 having a logic value of zero. When the quartz oscillator is also working, a logic value of zero is supplied through gate 528 to flipflop 517, 518 having two inputs, while the /reset inputs of flipflops 521–526 receive the logic value 1. Frequency divider 520 starts to divide the 32 Hz frequency supplied. After one second, the signal at the output of flipflop 560 passes to 1. Since the two inputs of flipflop 517, 518 receive the logic value 1, its output passes to zero, so that signal rud reaches the logic value 1. This value is then maintained as long as the current pp is sufficient and the quartz oscillator is also working.

When the generator is stopped, e.g., when the watch movement is being set, capacitor C3 is no longer fed by the generator. However, the IC continues to consume power, so voltage Vdd at C3 drops more and more. When the voltage has dropped so far that the quartz oscillator no longer functions, the meas and latch signals are no longer formed.

However, since it is not ensured that capacitor 514 is discharged quickly enough, it may happen that, although the circuit no longer has sufficient voltage, signal POR1 does not pass to binary one. The second power-on reset signal POR2 passes to binary one, however, as soon as the frequency from the frequency divider drops below a certain value. Thus, after a brief interval, signal rud appears again, so that switches 17, 18, 19 of the voltage transformer are triggered directly by comparators 200, 210 in this case, too.

In an embodiment which is not illustrated, the start-up of the IC is ensured only by means of signal POR2 from the frequency divider. Signal POR2 remains at zero. FIG. 9 illustrates a preferred design of counter circuit 6. In this design, circuit 6 comprises a 6-bit counter 60 which is formed, for example, by six resettable D-flipflops connected in series. The binary number formed by outputs Q1 to Q6 increases by one unit with each leading edge supplied to input 601. The counter is reset when a signal rud is supplied to reset-input 603.

A maximum detector 63 consisting of the two NAND gates 61, 62 and the OR gate blocks, by means of a NAND gate 64, the introduction of new UP pulses at incrementation input 601 when the maximum output state Q1=Q2 . . . =Q6=1 is reached. In the same way, a minimum detector 65, 66, 67, 68 prevents all counting down below the minimum output state /Q1=Q2=. . . =Q6=1. False counts outside the counting limits of counter 60 are thus prevented owing to the two state detectors.

Figure 10A:
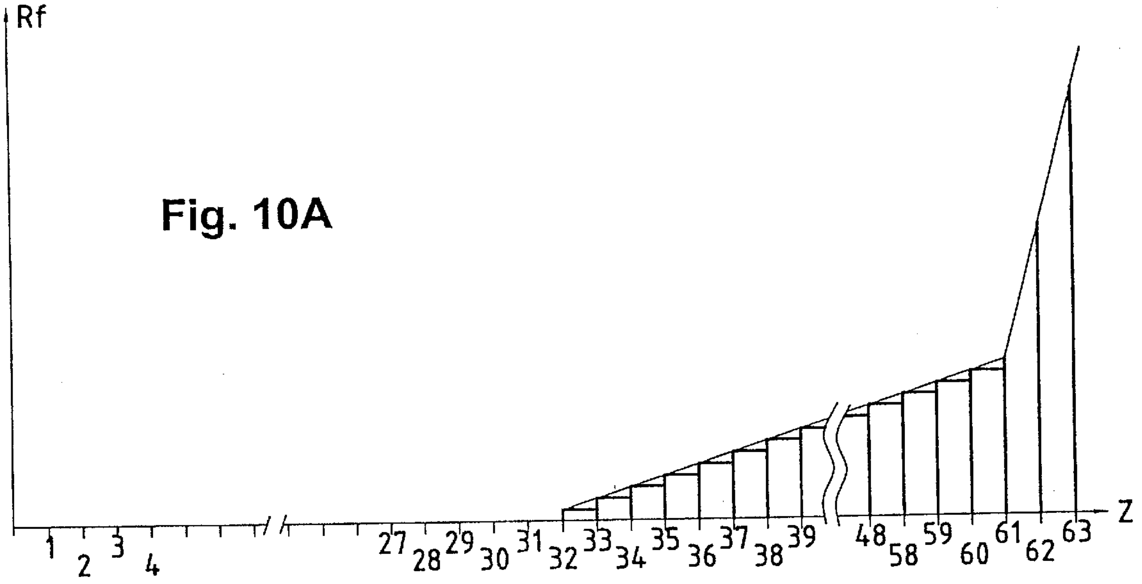
FIG. 10*a* is a graph showing the development of the braking current across the resistors Rf, which are selected as a function of the counter reading.

Signals Q1–Q6, supplied by counter 6, allow the coding of 64 different braking values. There is minimum braking when Q1=Q2=. . . =Q6=0 (level 0) and maximum braking when Q1=Q2=. . . =Q6=1 (level 63). According to the present invention, however, braking of the microgenerator does not increase linearly between these minimum and maximum values. The energy dissipation across braking resistor Rf of energy-dissipation circuit 9 preferably develops in such a way as plotted in the graph of FIG. 10A. Between 0 and 31, the frequency difference integrated by counter 6 between microgenerator 1 and oscillator 3, 4 is slight: no braking is caused. This allows fast acceleration of the microgenerator when the watch is set running, so the nominal speed is very quickly reached. Between 32 and 61, the energy dissipation increases linearly with a moderate rise. From level 62 on, the energy dissipation increases with a much sharper rise and reaches its maximum at level 63, so that the rotor of the microgenerator is braked hard if it starts spinning.

FIG. 10 illustrates energy-dissipation control means 30. They convert signals Q1:Q6 from the counter into signals B1:B63, which directly activate energy-dissipation circuit 9 shown in FIG. 11. As already explained in connection with FIG. 1, energy-dissipation circuit 9 is connected directly between inputs G+, G− of the microgenerator. It consists of a plurality of resistors 910 to 916 integrated in the IC. Switches 900 to 906, controlled by signals B1 to B5 and B62, 63 coming from energy-dissipation control means 30, permit modification of the number of parallel-disposed resistors. According to FIG. 10A, the resistances of resistors 910 to 916 are inversely proportional to the strength of control signals B1–B63: signals B62 and B63 thus control more effective braking than, e.g., signal B1.

Switches 900 to 906 are n-channel field-effect transistors. When the potential at the gate of the transistor is 0, the transistor is disabled, hence no current flows through the transistor. However, as soon as the potential at the source of the respective transistor is below Vss, the transistor becomes conducting. This means that the generator is braked because now a current is flowing since the resistors are connected between the terminals (G+ and G−) of the generator.

Depending upon which circuit is used, however, it is indispensable that the generator attain a substantially higher speed of rotation than the rated speed of rotation, and thus the highest possible output voltage, in order for the circuit to be able to start up at all. In this connection, however, it is possible for the voltage at G+ and G− to be less than Vss, so that the generator is then braked because the switching transistor for the brake becomes conducting. Yet if the high speed of rotation and thus the high output voltage are not attained, the circuit cannot start up because of the voltage drop across the diodes.

Now, in order that the generator may not be braked by energy-dissipation circuit 9 upon starting of the system, it is necessary to connect at least one p-channel field-effect transistor and at least one n-channel field-effect transistor in series if they are to serve as switches for connecting braking resistors between G+ and G−. According to the present invention, this is solved by means of a p-channel field-effect transistor 920. Transistor 920 can conduct only if the potential at the gate is lower than one threshold value below the source potential. That is certainly not the case when the system starts up, so that the generator is not braked, and it is possible to start the system.

N-channel and p-channel transistors can be used as good switches only in the vicinity of Vss and Vdd. If the potential at drain and source is somewhere between Vdd and Vss, it no longer suffices to trigger the gate with Vdd or Vss in order for the transistors to become conducting.

This is precisely the case with energy-dissipation circuit 9 and with switch 19 of the voltage doubler.

In order that the transistors may be used as switches under these conditions, the gate of the n-channel transistor must now be triggered with a voltage higher than Vdd in order for the transistor to conduct well. The same applies to the p-channel transistor, the gate of which must be activated with a voltage which is at least one threshold value lower than Vss in order for the transistor to become properly conducting.

Hence transistor 920 is not activated by means of Vss but rather by means of an LV signal which in active state has a substantially lower voltage than Vss. The formation of LV in circuit 30 is described in more detail below.

In the same way, n-channel transistors 900:906 cannot be triggered directly by means of signals Q1:Q6 from the counter because these signals cannot be higher than Vdd. These transistors are therefore activated by means of signals B1:B63, the logic states of which correspond to those of Q1:Q6, but the voltages of which are doubled. For this purpose, signals Q1–Q5 are converted into output signals B1–B5 in energy-dissipation control means 30 by means of level shifters 301–305.

In another embodiment of the invention (not shown), for similar reasons, switch 18 of voltage multiplicating circuit 2 is triggered by means of a signal having the same logic state as the signal par but a higher voltage. It would be equally possible to double the voltages of the signals par and ser which trigger switches 17 and 19.

Level shifters 301–305 in FIG. 10 are fed by a voltage HV obtained by doubling the voltage Vdd at capacitor C3 by means of a voltage doubler 31 (not shown). In order for the circuit to start up reliably, the voltage doubler must be so constructed that it supplies a voltage at least equal to Vdd even at the time of initialization. For this purpose, voltage doubler 31 may, for example, be triggered by signal rud already described, so that at the time of initialization, it supplies a voltage Vdd, and doubled voltage HV only after signal rud has changed its state when the quartz oscillator and the power source are both working.

The logic state "62" is indicated by an AND gate 306 when signals B2, B3, B4, and B5 are all at binary 1 (decimal 62 corresponds to binary 111110). Gate 306 multiplies signals B2 to B5 and supplies a signal B62 having the logic state 1 only when the count reaches levels 30 or 31. A second AND gate multiplies B62 by B1 in such a way that the logic state "63" is indicated by means of a signal B63. Signals B62 and B63 directly control transistors 905 and 906, respectively.

As already mentioned, circuit 30 supplies an LV signal intended to trigger p-channel transistor 920 in energy-dissipation circuit 9. The LV signal is generated by a level shifter 300. As already mentioned, in order for transistor 920 to be properly conducting, the voltage of the LV signal in the active state must be at least one threshold value lower than Vss. For this purpose, the output of level shifter 300 is connected to a capacitor 3005. A transistor 3006, functioning as a diode, is connected between the other side of capacitor 3005 and the point /rud. Transistor 3006 has a threshold value of Ue, e.g., 400 mV. When level shifter 300 supplies a voltage HV, the voltage charged in capacitor 3005 is ΔU HV-Ue. If the voltage at the output of level shifter 300 suddenly drops to Vss, the voltage of the LV signal drops to Vss-(HV-Ue), which permits transistor 920 to be made conducting.

When the system is initialized, signal /rud is at binary one, so that LV also remains at binary one, and transistor 920 is disabled. Transistor 920 cannot conduct until signal /rud is at binary zero.

Level shifter 300 is controlled by a signal /b in such a way that energy-dissipation circuit 9 brakes when signal /b is at binary zero. Signal /b is transmitted by a NAND gate 3080 which logically combines signals Q6 and p. Signal /b is at 1 when at least one of those two signals is zero. For example, if Q6 is zero, i.e., if counter 6 has not reached at least level 16, signal /b is 1, so that energy-dissipation circuit 9 can brake only from level 16 of the counter on, according to the graph in FIG. 10A. The formation of pulsing signal p by circuit 308 has already been explained with reference to FIG. 5*a*. Consequently, pulsing signal p always has a value of 1 except once per 1 kHz cycle during a 16 kHz half cycle. This serves the purpose of recharging the capacitor which produced the LV. Here braking is interrupted by pulsing signal p once per millisecond (pulsed braking). However, solutions are also conceivable using LV1 and LV2, hence two p-channel transistors, so that braking need not be interrupted.

In order for the system to be stable, the charging of capacitors C1, C2, and C3 must be separate from the braking, i.e., the moment of braking must not be dependent upon charging. In the circuit shown in FIG. 10, braking takes place during the entire period. The voltage drop is consequently relatively small; moreover, this voltage drop exists only when hard braking takes place. This is tantamount to a high driving moment and thus to greater certainty that after an impact, the generator can be rapidly accelerated again and the system again supplied with power. It would also be possible, however, to separate braking and charging altogether. For example, during one positive and negative half-wave first only braking would take place, and during the next positive and negative half-wave only the capacitors would be charged. Thus the voltage drop caused by braking is omitted, and the capacitors are charged to the maximum.

What is claimed is:

1. An electronic circuit for regulating the speed of rotation of a microgenerator, comprising: a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, a rectifier and voltage-transformer circuit for rectifying and multiplying the signal between said first and second inputs, the rectifier and voltage-transformer circuit comprising at least one capacitor which can be charred by said microgenerator via at least one switch, and at least one control circuit of said switch or switches, wherein said control circuit comprises at least one storage means which in a first phase with blocked switch stores at least one control signal to be applied to said switches, said switches being triggered in a second phase by means of said control signal, and wherein said control circuit comprises a comparator, said comparator being used for generating said control signal applied to said control means.

2. The electronic circuit of claim 1, wherein said energy-dissipation circuit is connected between said inputs intended for connection to said microgenerator.

3. The electronic circuit of claim 1, wherein said energy-dissipation circuit is connected between the inputs intended for connection to said capacitor charged by said microgenerator.

4. The electronic circuit of claim 1, wherein said energy-dissipation control means have a counter, the count of which depends upon the frequency difference between said microgenerator and the oscillator, the energy dissipation of the energy-dissipation circuit being a function of said count.

5. The electronic circuit of claim 4, wherein the count of the counter increases with each pulse of an incrementation signal coming from the signal between the two inputs and decreases with each pulse of a decrementation signal coming from said oscillator.

6. The electronic circuit of claim 5, further comprising means for resetting said counter to a predetermined value when a voltage is applied to the circuit.

7. The electronic circuit of claim 4, wherein the energy dissipation of said energy-dissipation circuit can assume at least three specific values.

8. The electronic circuit of claim 1, further comprising means for minimizing the energy dissipation of said energy-dissipation circuit when a voltage is applied to the electronic circuit.

9. The electronic circuit of claim 1, wherein said oscillator is connected to a frequency divider.

10. The electronic circuit of claim 1, wherein said rectifier and voltage-transformer comprises at least one capacitor which is charged via one or more passive elements when a voltage is applied to the electronic circuit, said passive element or elements being replaced by active elements as soon as the voltage charged in the capacitor or capacitors suffices to activate the active element or elements.

11. An electronic circuit for regulating the speed of rotation of a microgenerator, of the type having a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, a rectifier and voltage-transformer circuit for rectifying and multiplying the signal between said first and second inputs, the rectifier and voltage-transformer circuit comprising at least one capacitor which can be charged by said microgenerator via at least one switch, and at least one control circuit of said switch or switches.

wherein said control circuit comprises at least one storage means which in a first phase with blocked switch stores at least one control signal to be applied to said switches, said switches being triggered in a second phase by means of said control signal, and wherein braking is blocked during every other cycle of the signal from said microgenerator.

12. An electronic circuit for regulating the speed of rotation of a microgenerator, of the type having a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said first input and said second input, a rectifier and voltage-transformer circuit for rectifying and multiplying the signal between said first and second inputs, the rectifier and voltage-transformer circuit having a stabilized power source and comprising at least one capacitor which can be charged by said microgenerator via at least one switch, and at least one control circuit of said switch or switches, wherein said control circuit comprises:

at least one storage means which in a first phase with blocked switch stores at least one control signal to be applied to said switches, said switches being triggered in a second phase by means of said control signal, an initialization means transmitting a signal of a specific value as long as current supplied by said stabilized power source does not reach a predetermined value, and said initialization means transmitting a signal of the opposite value of said specific value as soon as the current supplied by said stabilized power source exceeds said predetermined value.

13. The electronic circuit of claim 12, wherein said initialization means comprise delay means.

14. An electronic circuit for regulating the speed of rotation of a microgenerator, comprising: a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, a rectifier and voltage-transformer circuit for rectifying and multiplying the signal between said first and second inputs, the rectifier and voltage-transformer circuit comprising at least one capacitor which can be charged by said microgenerator via at least one switch, and at least one control circuit of said switch or switches, wherein said control circuit comprises at least one storage means which in a first phase with blocked switch stores at least one control signal to be applied to said switches, said switches being triggered in a second phase by means of said control signal, and further comprising initialization means transmitting a signal of a specific value as long as the quartz oscillator is not working, and a signal of the opposite value is transmitted as soon as the quartz oscillator is working.

15. An electronic circuit for regulating the speed of rotation of a microgenerator, comprising: a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, a rectifier and voltage-transformer circuit for rectifying and multiplying the signal between said first and second inputs, the rectifier and voltage-transformer circuit comprising at least one capacitor which can be charged by said microgenerator via at least one switch, and at least one control circuit of said switch or switches, wherein said control circuit comprises at least one storage means which in a first phase with blocked switch stores at least one control signal to be applied to said switches, said switches being triggered in a second phase by means of said control signal, and further comprising initialization means transmitting the following signals:

a first power-on reset signal having a specific value as long as the current supplied by said stabilized power source does not reach a given value, and having the opposite value as soon as the current supplied by said stabilized power source exceeds said predetermined value, a second power-on reset signal having a specific value as long as the quartz oscillator is not working, and having the opposite value as soon as the quartz oscillator is working, said initialization means further comprising means for combining the two power-on reset signals.

16. An electronic circuit for regulating the speed of rotation of a microgenerator, comprising: a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, a rectifier and voltage-transformer circuit for rectifying and multiplying the signal between said first and second inputs, the rectifier and voltage-transformer circuit comprising at least one capacitor which can be charged by said microgenerator via at least one switch, and at least one control circuit of said switch or switches, wherein said control circuit comprises at least one storage means which in a first phase with blocked switch stores at least one control signal to be applied to said switches, said switches being triggered in a second phase by means of said control signal, and wherein said energy-dissipation control means comprise the following components:

a hysteresis comparator which compares the signal between said first and second inputs, and an anticoincidence circuit which is connected to the output of said hysteresis comparator and transmits said incrementation signal.

17. An electronic circuit for regulating the speed of rotation of a microgenerator, comprising:

a first input and a second input for connection to said microgenerator, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, said energy-dissipation circuit having a network of elements connected in parallel, each element comprising a resistor in series with a switch, the total resistance of the energy-dissipation circuit being controllable by connecting in a predetermined combination of switches, and a rectifier and voltage-transformer circuit for rectifying and multiplying the signal between said first and second inputs, said switches in series with said resistors being n-channel field-effect transistors, said energy-dissipation circuit further comprising at least one p-channel field-effect transistor connected to said network of elements connected in parallel, and said electronic circuit further including means for controlling said p-channel field-effect transistor in order to disable said p-channel field-effect transistor when the electronic circuit is put into operation, so that braking of said microgenerator is nullified.

18. The electronic circuit of claim 17, wherein said n-channel transistors are triggered by means of a voltage higher than Vdd, said p-channel field-effect transistor being triggered by means of a voltage which is at least one threshold value lower than Vss.

19. The electronic circuit of claim 17, wherein said control circuit comprises a comparator, said comparator being used for generating said control signal applied to said control means.

20. The electronic circuit of claim 17, wherein braking is blocked during every other cycle of the signal from said microgenerator.

21. The electronic circuit of claim 17, wherein said energy-dissipation circuit is connected between said inputs intended for connection to said microgenerator.

22. The electronic circuit of claim 17, wherein said energy-dissipation circuit is connected between the inputs intended for connection to said capacitor charged by said microgenerator.

23. The electronic circuit of claim 17, wherein said energy-dissipation control means include a counter, the count of which is a function of the frequency difference between the generator and the oscillator, the energy dissipation of the energy-dissipation circuit being a function of said count.

24. The electronic circuit of claim 23, wherein the count of the counter increases with each pulse of an incrementation signal coming from the signal between the two inputs and decreases with each pulse of a decrementation signal coming from said oscillator.

25. The electronic circuit of claim 24, further comprising means for resetting said counter to a predetermined value when a voltage is applied to the circuit.

26. The electronic circuit of claim 23, wherein the energy dissipation of said energy-dissipation circuit can assume at least three specific values.

27. The electronic circuit of claim 17, further comprising initialization means transmitting a signal of a specific value as long as the current supplied by said stabilized power source does not reach a given value, and a signal of the opposite value is transmitted as soon as the current supplied by said stabilized power source exceeds said predetermined value.

28. The electronic circuit of claim 27, wherein said initialization means comprise delay means.

29. The electronic circuit of claim 17, further comprising initialization means transmitting a signal of a specific value as long as the quartz oscillator is not working, and a signal of the opposite value is transmitted as soon as the quartz oscillator is working.

30. The electronic circuit of claim 17, further comprising initialization means transmitting the following signals:

a first power-on reset signal having a specific value as long as the current supplied by said stabilized power source does not reach a given value, and having the opposite value as soon as the current supplied by said stabilized power source exceeds said predetermined value, a second power-on reset signal having a specific value as long as the quartz oscillator is not working, and having the opposite value as soon as the quartz oscillator is working, said initialization means further comprising means for combining the two power-on reset signals.

31. The electronic circuit of claim 17, further comprising means for minimizing the energy dissipation of said energy-dissipation circuit when a voltage is applied to the electronic circuit.

32. The electronic circuit of claim 17, wherein said oscillator is connected to a frequency divider.

33. The electronic circuit of claim 17, wherein said energy-dissipation control means comprise the following components;

a hysteresis comparator which compares the signal between said first and second inputs, and an anticoincidence circuit which is connected to the output of said hysteresis comparator and transmits said incrementation signal.

34. The electronic circuit of claim 17, wherein said rectifier and voltage-transformer comprises at least one capacitor which is charged via one or more passive elements when a voltage is applied to the electronic circuit, said passive element or elements being replaced by active elements as soon as the voltage charged in the capacitor or capacitors suffices to activate the active element or elements.

35. An electronic circuit for regulating the speed of rotation of a microgenerator, comprising:

a first input and a second input for connection to said microgenerator, a rectifier and voltage-transformer circuit for rectifying and multiplying the signal between said first and second inputs, the rectifier and voltage-transformer circuit comprising at least one switch connected between said first input and ground in this electronic circuit, and a comparator for controlling the first switch, an oscillator supplying a reference signal of a predetermined frequency, an energy-dissipation circuit for braking said microgenerator, energy-dissipation control means for controlling the energy dissipation of the energy-dissipation circuit as a function of the reference signal and of the signal between said inputs, and a stabilized power source feeding said comparator in the rectifier and voltage-transformer circuit, said stabilized power source comprising an initialization transistor permitting current to be fed into or withdrawn from said power source.

36. The electronic circuit of claim 35, wherein said initialization transistor is connected to said first input and ground in such a way that current is supplied or received by said power source as long as said first input exhibits a potential difference relative to ground.

37. The electronic circuit of claim 35, wherein said initialization transistor is an n-channel field-effect transistor, the gate of which is grounded, and the source of which is connected to said first input.

38. The electronic circuit of claim 37, wherein said control circuit comprises a comparator, said comparator being used for generating said control signal applied to said control means.

39. The electronic circuit of claim 35, wherein braking is blocked during every other cycle of the signal from said microgenerator.

40. The electronic circuit of claim 35, further comprising level shifters for increasing the voltage of the signals controlling said p-channel field-effect transistors.

41. The electronic circuit of claim 35, wherein said energy-dissipation circuit is connected between said inputs intended for connection to said microgenerator.

42. The electronic circuit of claim 35, wherein said energy-dissipation circuit is connected between the inputs intended for connection to said capacitor charged by said microgenerator.

43. The electronic circuit of claim 35, wherein said energy-dissipation control means have a counter, the count of which depends upon the frequency difference between said microgenerator and the oscillator, the energy dissipation of the energy-dissipation circuit being a function of said count.

44. The electronic circuit of claim 43, wherein the count of the counter increases with each pulse of an incrementation signal coming from the signal between the two inputs and decreases with each pulse of a decrementation signal coming from said oscillator.

45. The electronic circuit of claim 44, further comprising means for resetting said counter to a predetermined value when a voltage is applied to the circuit.

46. The electronic circuit of claim 43, wherein the energy dissipation of said energy-dissipation circuit can assume at least three specific values.

47. The electronic circuit of claim 35, further comprising initialization means transmitting a signal of a specific value as long as the current supplied by said stabilized power source does not reach a given value, and a signal of the opposite value is transmitted as soon as the current supplied by said stabilized power source exceeds said predetermined value.

48. The electronic circuit of claim 47, wherein said initialization means comprise delay means.

49. The electronic circuit of claim 35, further comprising initialization means transmitting a signal of a specific value as long as the quartz oscillator is not working, and a signal of the opposite value is transmitted as soon as the quartz oscillator is working.

50. The electronic circuit of claim 35, further comprising initialization means transmitting the following signals:

a first power-on reset signal having a specific value as long as the current supplied by said stabilized power source does not reach a given value, and having the opposite value as soon as the current supplied by said stabilized power source exceeds said predetermined value, a second power-on reset signal having a specific value as long as the quartz oscillator is not working, and having the opposite value as soon as the quartz oscillator is working, said initialization means further comprising means for combining the two power-on reset signals.

51. The electronic circuit of claim 35, further comprising means for minimizing the energy dissipation of said energy-dissipation circuit when a voltage is applied to the electronic circuit.

52. The electronic circuit of claim 35, wherein said oscillator is connected to a frequency divider.

53. The electronic circuit of claim 35, wherein said energy-dissipation control means comprise the following components;

a hysteresis comparator which compares the signal between said first and second inputs, and an anticoincidence circuit which is connected to the output of said hysteresis comparator and transmits said incrementation signal.

54. The electronic circuit of claim 35, wherein said rectifier and voltage-transformer comprises at least one capacitor which is charged via one or more passive elements when a voltage is applied to the electronic circuit, said passive element or elements being replaced by active elements as soon as the voltage charged in the capacitor or capacitors suffices to activate the active element or elements.

* * * * *

UNITED STATES PATENT AND TRADEMARK OFFICE

CERTIFICATE OF CORRECTION

PATENT NO. : 6,194,878 B1
DATED : February 27, 2001
INVENTOR(S) : Konrad Schafroth It is certified that error appears in the above-identified patent and that said Letters Patent is hereby corrected as shown below:

Column 4,
Line 14, delete "HV" and insert -- HV > Vdd --.
Line 15, delete "LV" and insert -- LV < Vss --.

Column 5,
Line 30, delete "VC2" and insert -- $V_{C2}$ --.

Column 9,
Line 53, delete "/Q1=Q2=…=/Q6=1" and insert -- /Q1=Q2..=/Q6=1 --.

Column 12,
Line 38, delete "charred" and insert -- charged --.

Signed and Sealed this

Sixteenth Day of July, 2002

*Attest:*

JAMES E. ROGAN

*Attesting Officer* *Director of the United States Patent and Trademark Office*

UNITED STATES PATENT AND TRADEMARK OFFICE

CERTIFICATE OF CORRECTION

PATENT NO. : 6,194,878 B1
DATED : February 27, 2001
INVENTOR(S) : Konrad Schafroth It is certified that error appears in the above-identified patent and that said Letters Patent is hereby corrected as shown below:

<u>Column 4,</u>
Line 14, delete "HV" and insert -- HV > Vdd --.
Line 15, delete "LV" and insert -- LV < Vss --.

<u>Column 5,</u>
Line 30, delete "VC2" and insert -- $V_{C2}$ --.

<u>Column 9,</u>
Line 53, delete "/Q1=Q2=…=/Q6=1" and insert -- /Q1=1Q2..=/Q6=1 --.

<u>Column 12,</u>
Line 38, delete "charred" and insert -- charged --.

This certificate supersedes Certificate of Correction issued July 16, 2002.

Signed and Sealed this

Tenth Day of September, 2002

*Attest:*

JAMES E. ROGAN
*Director of the United States Patent and Trademark Office*

*Attesting Officer*

UNITED STATES PATENT AND TRADEMARK OFFICE

CERTIFICATE OF CORRECTION

PATENT NO. : 6,194,878 B1
DATED : February 27, 2001
INVENTOR(S) : Konrad Schafroth It is certified that error appears in the above-identified patent and that said Letters Patent is hereby corrected as shown below:

Column 4,
Line 14, delete "HV" and insert -- HV > Vdd --.
Line 15, delete "LV" and insert -- LV < Vss --.

Column 5,
Line 30, delete "VC2" and insert -- $V_{C2}$ --.

Column 9,
Line 53, delete "/Q1=Q2=…=/Q6=1" and insert -- /Q1=/Q2..=/Q6=1 --.

Column 12,
Line 38, delete "charred" and insert -- charged --.

This certificate supersedes Certificate of Correction issued September 10, 2002.

Signed and Sealed this

Twelfth Day of November, 2002

*Attest:*

JAMES E. ROGAN

*Attesting Officer*

*Director of the United States Patent and Trademark Office*